L. LITTLEJOHN.
Bung-Bush Inserters.

No. 145,807. Patented Dec. 23, 1873.

UNITED STATES PATENT OFFICE.

LOMAX LITTLEJOHN, OF NEW YORK, N. Y.

IMPROVEMENT IN BUNG-BUSH INSERTERS.

Specification forming part of Letters Patent No. 145,807, dated December 23, 1873; application filed September 27, 1873.

*To all whom it may concern:*

Figure 1:
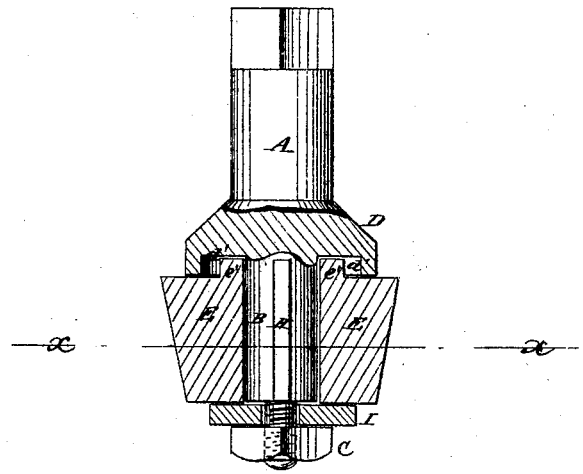
Figure 2:
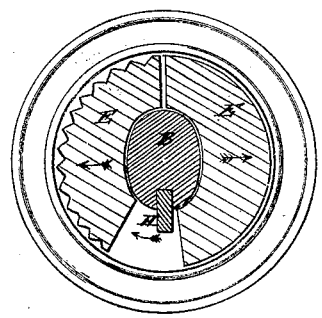

Be it known that I, LOMAX LITTLEJOHN, of the city, county, and State of New York, have invented a new and useful Improvement in Bung-Bush Inserter, of which the following is a specification:

Figure 1 is a longitudinal section of my improved bung-bush inserter, and Fig. 2 is a cross-section of the same taken through the line $x$ $x$ of Fig. 1.

The object of my invention is to improve the bung-bush inserter for which Letters Patent No. 138,568 were granted to me May 6, 1873, so as to make it more satisfactory in application by making it impossible for it to burst the bush however much power may be applied to the inserter.

The invention will first be fully described, and then pointed out in the claim.

A represents the shank of the tool, the upper part of which is so formed as to receive a wrench for operating it. Upon the lower end of the shank A is formed an elliptic journal, B, having a screw-thread cut upon its lower end to receive a nut, C. Upon the shank A, at the upper end of the journal B, is formed a collar, D, around which is formed a ring-groove, $d'$, concentric with the axis of the shank A to receive the ring flange or tongue $e'$ formed upon the upper end of the split sleeve E. The tongue $e'$ of the split sleeve E is made narrower than the groove $d'$ of the collar D, so that the said sleeve E may be expanded. The cavity of the split sleeve E is made elliptical or elongated, the longer axis being in the direction of the plane of division, so that, when the elliptical journal B is turned, bringing its longer axis in line with the plane of division of the sleeve E, the edges of the parts of the sleeve E, upon one or both sides, may come in contact with each other. The outer surface of the sleeve E is made of the same taper as the bung-bush, so that it may fit into the said bush. The outer surface of the sleeve E may be made plain, or it may be toothed or roughened to cause it to take a firm hold upon the bush. By this construction, when the sleeve E has been inserted in the bush and the shank A is turned, the elliptical journal B will expand the sleeve E, causing it to grasp the bush firmly and screw it into the bung-hole in the stave. In case the stave is hard, and considerable power is required to force the bush into place, the powerful expansion of the sleeve E will sometimes burst or split the bush. To remedy this a flange or tongue, H, is formed upon or attached to the elliptical journal B, which enters a slot or groove in the sleeve E which strikes against the side of a shoulder of said slot or groove, and thus turns the bush, the said tongue and slot or groove being so arranged that the sleeve E will be expanded sufficiently before the tongue strikes the shoulder or side of the slot or groove. The tongue H may be formed upon the elliptical journal upon either its longer or shorter axis, and the slot or groove may be formed by cutting off one or both the adjacent edges of the split sleeve E upon one side, or it may be formed in the inner surface of one of the parts of the split sleeve E, according as the tongue H is formed upon the longer or shorter axis of the elliptical journal B. I is a washer, placed upon the lower end of the journal B to prevent the nut C from being loosened by the movements of the sleeve E.

Having thus described my invention, I claim as new, and desire to secure by Letters Patent—

The combination, with an ellipsoidal shank, A, used to spread the two parts of a cut ring, of the tongue H, arranged as and for the purpose set forth.

LOMAX LITTLEJOHN.

Witnesses:
JAMES T. GRAHAM,
T. B. MOSHER.